E. L. PHIPPS,

Assignor to THE MILFORD DOOR KNOB COMPANY.

KNOB ATTACHMENT.

No. 10,066. Reissued Mar. 28, 1882.

Witnesses,
Phil. W. Hale.
Thos J. Godwin

Inventor,
Edward L. Phipps,
by W B Hale, Associate Attorney,
for W. W. Leggett
Attorney.

N. PETERS, Photo-Lithographer, Washington, D. C.

UNITED STATES PATENT OFFICE.

EDWARD L. PHIPPS, OF MILFORD, MICHIGAN, ASSIGNOR TO THE MILFORD DOOR KNOB COMPANY, OF SAME PLACE.

KNOB ATTACHMENT.

SPECIFICATION forming part of Reissued Letters Patent No. 10,066, dated March 28, 1882.

Original No. 241,059, dated May 3, 1881. Application for reissue filed February 4, 1882.

*To all whom it may concern:*

Be it known that I, EDWARD L. PHIPPS, of Milford, in the county of Oakland and State of Michigan, have invented an Improvement in Knob Attachments to Mortise Door-Latches, of which the following is a specification.

The nature of this invention relates to certain new and useful improvements in the construction of knob attachments to locks or latches; and the invention consists in the peculiar construction of the knob-shaft and its combination with devices by means of which the latch may be operated by or released from the operation of the knobs and shaft, as more fully hereinafter described.

Figure 1:
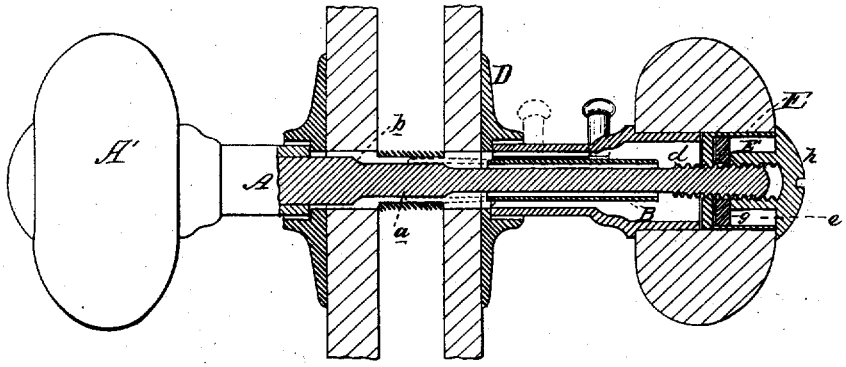
Figure 2:
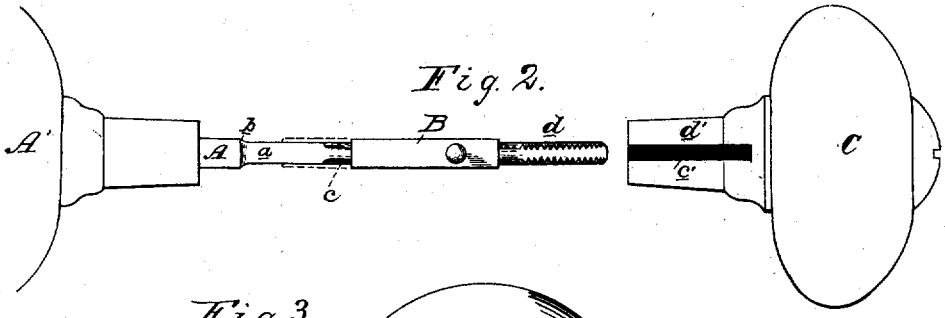
Figure 3:
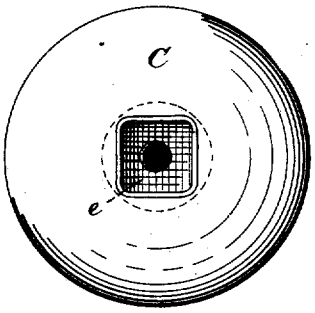

In the drawings, Figure 1 is a longitudinal vertical central section of my improved device. Fig. 2 is an elevation of the shaft with one knob removed and showing the sleeve. Fig. 3 is an end elevation of the removable knob, showing the square recess therein.

In the accompanying drawings, which form a part of this specification, A represents the shaft or spindle, to which the knob A′ is secured in the usual manner. This spindle is square, as shown, one-half its length, and is reduced at its center, as shown at *a*, whereby a shoulder, *b*, is formed. That portion of the spindle extending from such squared part is round, as shown at *c*, as far as the threaded portion *d*, which in turn is squared, bearing the threads projecting from each corner.

B is a square slide, the exterior area of which is the same size as the mortise in the hub of the latch. The inner area of this slide is a trifle larger than the spindle, which latter will turn freely in the hub when the slide is withdrawn. The slide is provided with a thumb-piece or handle, which projects outwardly through a slot, *c′*, in the shank *d′* of the removable knob C. As this thumb-piece projects outside of the rose D, it may be forced inward or withdrawn at pleasure. The threaded end of the spindle is inserted through the knob C.

E is a sleeve, provided with a rectangular and deeply-sunken recess, *e*, within which there is placed a similarly-shaped washer, *g*, which slips onto the squared end of the spindle, simultaneously engages both the angular part of the sleeve and the angular part of the spindle, and prevents the knob from turning on the shaft. A socket-nut, E′, provided with a flange-head, *h*, to cover the recess, is then screwed onto the end of the spindle. The aperture through the bottom of the recess *e* in the sleeve E is threaded to engage with the threaded end of the spindle, and the only use of the flanged nut is to retain the washer in place in the recess in the knob and hold the knob C from slipping off.

I have described my invention in one of its forms of application only; but I do not desire to confine myself to the exact construction as above set forth, as it is evident that the spindle may be reduced its entire length, so that it will freely turn within the hub of the latch or lock, except when the slide is inserted, which then fills the mortise in the hub and causes the latch to operate.

In practice the slide is forced inward when it is desired to have the turning of the knob operate the latch, and retracted or withdrawn when it is desired that the latch shall not be operated.

What I claim as my invention is—

1. In a knob attachment, an angular spindle-screw cut upon its corners, an angular sleeve-screw tapped to engage said spindle, a locking-washer adapted to slip longitudinally over the spindle and simultaneously engage the angular part of the sleeve and the angular part of the spindle, and thereby lock them together, and means for holding said washer in place upon the spindle, substantially as described.

2. In combination with a knob interiorly threaded, and with an interiorly-threaded spindle which is squared at the engaging end, as described, a rectangular recess in the outer face of said knob and a similarly-shaped washer, substantially as set forth.

3. In combination with the knob C, provided with a rectangular recess, *e*, and with a spindle and rectangular washer, as described, the flanged nut E′, substantially as and for the purposes specified.

4. In combination with the spindle A, constructed so that it will freely turn within the hub of the lock through which it passes, and made partly round and partly square, as shown, a slide, B, upon said spindle, which engages with the hub of the lock, subtantially as and for the purposes described.

In testimony whereof I sign this specification in the presence of two witnesses.

EDWARD L. PHIPPS. [L. S.]

Witnesses:

WALTER CRAWFORD,
MARY E. CRAWFORD.